(12) United States Patent
Juřík et al.

(10) Patent No.: US 10,816,388 B2
(45) Date of Patent: Oct. 27, 2020

(54) WEIGHT MEASURING DEVICE AND THE MEASURING METHOD

(71) Applicants: CROSS Zlín, a.s., Zlín (CZ); NETWORK GROUP, s.r.o., Brno-Černovice (CZ)

(72) Inventors: Tomáš Juřík, Zlín (CZ); František Urban, Prostějov (CZ); Radek Helán, Brno (CZ)

(73) Assignees: CROSS Zlín, a.s., Zlín (CZ); NETWORK GROUP, s.r.o., Brno-Černovice (CZ)

( * ) Notice: Subject to any disclaimer, the term of this patent is extended or adjusted under 35 U.S.C. 154(b) by 94 days.

(21) Appl. No.: 15/761,165

(22) PCT Filed: Sep. 13, 2016

(86) PCT No.: PCT/CZ2016/000101
§ 371 (c)(1),
(2) Date: Mar. 19, 2018

(87) PCT Pub. No.: WO2017/045656
PCT Pub. Date: Mar. 23, 2017

(65) Prior Publication Data
US 2018/0274966 A1    Sep. 27, 2018

(30) Foreign Application Priority Data
Sep. 18, 2015   (CZ) ................................. 2015-639

(51) Int. Cl.
*G01G 19/02* (2006.01)
*G01G 3/12* (2006.01)
(52) U.S. Cl.
CPC ............. *G01G 19/022* (2013.01); *G01G 3/12* (2013.01)

(58) Field of Classification Search
CPC ................................ G01G 19/022; G01G 3/12
See application file for complete search history.

(56) References Cited

U.S. PATENT DOCUMENTS 3,665,756 A    5/1972   Russell
3,782,486 A *  1/1974   Kuhn ................... G01G 7/06
                                                      177/210 R
(Continued)

FOREIGN PATENT DOCUMENTS

EP    2 372 322 A1    10/2011

OTHER PUBLICATIONS

International Search Report and Written Opinion for corresponding Patent Application No. PCT/CZ2016/000101 dated Jan. 3, 2017.

Primary Examiner — Marrit Eyassu
(74) Attorney, Agent, or Firm — Renner, Otto, Boisselle & Sklar, LLP

(57) ABSTRACT

A weight measuring device, especially a device to measure weight from which further parameters of passing vehicles such as speed, acceleration, deceleration, turning to the right and to the left, direction of movement, number and type of axles, condition of individual tires, containing at least two measuring elements (1,2) which contains at least one group (3) of measuring elements (1,2) arranged in a body (4) which is part of the road surface (11), of which at least one is a (body (4) deformation) load measuring element and at least one another measuring element is arranged in the body (4) in such a manner that it is a measuring element (2) with a zero deformation load or with a deformation load different from that of the load measuring element (1). The measuring method, especially the method of measuring various parameters of passing vehicles according to which at least one (body (4) deformation) load measuring element (1) and at least one another measuring element (2) with a zero deformation load or with a deformation load different from that of (Continued)

Figure 1:
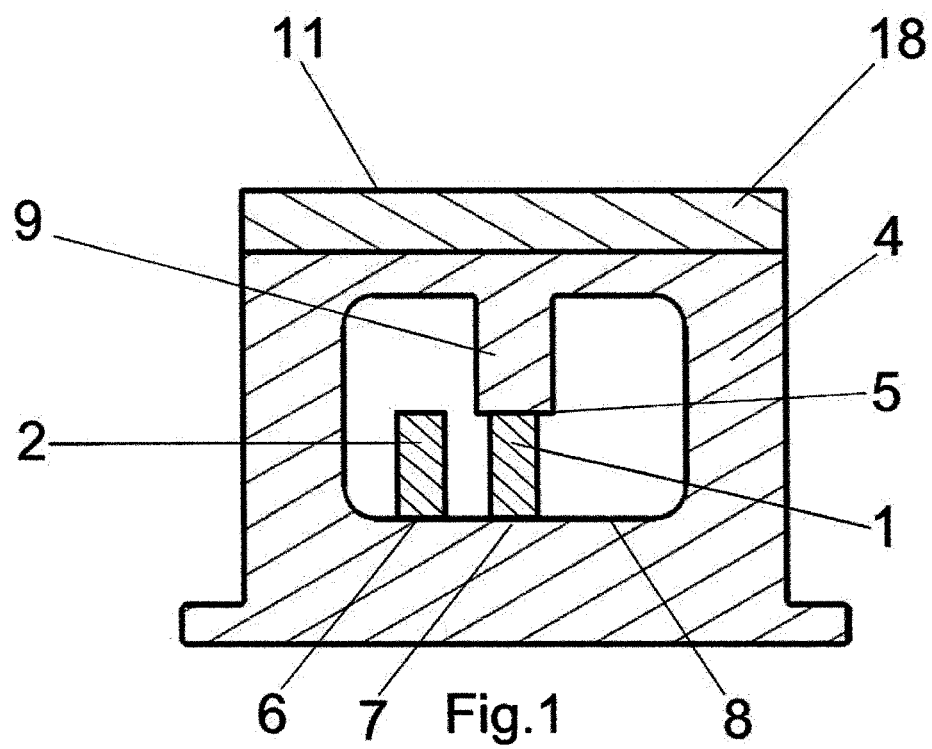

the load measuring element (1) arranged in at least one group (3) transmit continuously, when the vehicle passes over, parameters of light passage for further processing in/by at least one evaluation unit where the difference of these parameters is determined.

11 Claims, 4 Drawing Sheets

(56) References Cited

U.S. PATENT DOCUMENTS

| | | | | |
|---|---|---|---|---|
| 4,560,016 A * | 12/1985 | Ibanez | ............... | G01G 19/03 |
| | | | | 177/132 |
| 4,793,429 A * | 12/1988 | Bratton | ............... | G01G 3/13 |
| | | | | 177/1 |
| 5,111,897 A * | 5/1992 | Snyder | ............... | G01P 3/64 |
| | | | | 177/1 |
| 5,260,520 A * | 11/1993 | Muhs | ............... | G01G 19/03 |
| | | | | 177/210 R |
| 5,265,481 A * | 11/1993 | Sonderegger | ............... | G01G 3/13 |
| | | | | 177/210 C |
| 5,461,924 A | 10/1995 | Calderara et al. | | |
| 5,913,245 A * | 6/1999 | Grossman | ............... | G01L 1/245 |
| | | | | 250/227.14 |
| 7,094,976 B2 * | 8/2006 | Kim | ............... | G01G 19/024 |
| | | | | 177/132 |
| 2004/0061628 A1 * | 4/2004 | Hill | ............... | E01F 11/00 |
| | | | | 340/942 |
| 2013/0220709 A1 | 8/2013 | Trakhimovich | | |

\* cited by examiner

WEIGHT MEASURING DEVICE AND THE MEASURING METHOD

This application is a national phase of International Application No. PCT/CZ2016/000101 filed Sep. 13, 2016 and published in the English language, which claims priority to Czech Republic Patent Application No. PV2015-639 filed Sep. 18, 2015, which are hereby incorporated herein by reference.

TECHNICAL FIELD

The invention concerns a device to measure weight and various other parameters of passing vehicles including the method of such measuring.

STATE OF THE ART

At the present time, there exist two basic groups of devices to measure weight of passing vehicles which facilitate such measuring at the speed of over 50 km per hour. As for their design, the said devices measure the weight using a deflecting plate where the deflection caused by the pressure of the wheel is transferred to tensometric measuring elements. Furthermore, weight measuring devices where the pressure of the wheel is transferred through deformation of a mechanical profile to piezoelectric measuring elements are known.

From the European patent application EP 2372322 a system to measure weight of passing vehicles placed below the road surface is known. The system consists of multiple rows of measuring sensors connected with a read-out unit. Each row contains a number of measuring zones separated one from another in the longitudinal direction. The axial rigidity of the measuring zones in a direction perpendicular to the carriageway is higher than the axial rigidity of the intermediate zones. Each measuring zone is equipped with at least one sensor to measure deformation of this measuring zone in response to a force exerted practically perpendicularly to the carriageway. A disadvantage of this system, apart from other things, is the fact that it is placed under the carriageway surface which means a considerable loss of accuracy due to temperature differences or to natural ageing of the carriageway surface causing plasticity changes of the material above the sensor.

The system known from the American Patent U.S. Pat. No. 5,461,924 has similar disadvantages. The system is installed in the carriageway or runway surface and is used to detect wheel loads of vehicles or aircrafts and/or their shear components on the surface during travel. The sensor is constructed as a flanged tube sensor with pressure sensitive piezo-plates. A disadvantage of this system is its relatively complicated structure and also the fact that the piezo-plates are not resistant to electromagnetic interference.

Another device to weigh a moving vehicle on a roadway is known from patent document US 2013220709 A1. The device is based on the principle of measuring deflection of a weighing platform which is measured by a load cell in the vertical direction provided that horizontal forces are measured also always measured. A disadvantage of this system is the fact that the weighing platform must be loaded by the whole track of the wheel to be able to measure something. This, however, is considerably disadvantageous because it brings the necessity of compensation of dynamic forces applied by the vehicle wheel to the weighing platform, i.e. a compensation of the horizontal component of the surface load generated by wheel shear along the device surface. For that reason, the device is provided with a measuring element to measure the horizontal component of the load applied by the wheel to the surface. It is obvious from the above that this device is not capable of a very accurate weight measurement.

It is obvious from the aforementioned state of the art, that the current state of the art has a whole series of disadvantages. The designs known up to date are relatively inaccurate which is partly caused by the fact that they are placed under the roadway surface and the measurement results are biased by changes in plasticity of the material above the measuring elements. Another great disadvantage is the fact that most devices use sensors working with low-voltage electric signals which are, however, highly sensitive to electromagnetic interference. This causes a further decrease in the measurement accuracy. It can even happen that the interference can make the measurement entirely impossible. Another great disadvantage of the designs known is the fact that they are installed in the body of the roadway or carriageway which means that any maintenance work cannot go without, at least partial, destruction of the carriageway.

The goal of this invention is the design of such a device to measure the weight of passing vehicles that will be more accurate, whose design will be simple and, at the same time, which will be easy to install and to maintain, i.e. without any unnecessary destruction of the carriageway.

PRINCIPLE OF THE INVENTION

The aforementioned weaknesses are, to a large extent, eliminated and the goals of the invention accomplished by the weight measuring device, especially the device to measure the weight of passing vehicles and to determine (from the weight) further parameters of the passing vehicles (such as speed, acceleration, deceleration, turning to the left and to the right, the direction of movement, number and type of axles, condition of individual tires) containing at least two measuring elements, especially the weight measuring device according to the invention, the nature of this weight measuring device which consists in the fact that it comprises at least one group of measuring elements arranged in its body which is a part of the road surface, of which at least one is a body load deformation measuring element and at least one another element is arranged in the body in such a manner that it is an element with a zero deformation load or with a deformation load different from the body load deformation measuring element. The body is arranged in the carriageway surface in such a manner that it is deformed by the load of the wheels of the vehicle passing over it. An advantage of this arrangement is the fact that the measuring elements are arranged very close to each other so that the temperature, position, production and installation errors are minimized when carrying out a mutual comparative measurement.

It is very advantageous if the (body deformation) load measuring element is arranged in such a point in the body where the load-induced deformation is the highest and the element with a zero deformation load or with a deformation load different from the (body deformation) load measuring element is arranged in such a point in the body where its load-induced deformation is zero or different from the point where the (body deformation) load measuring element is arranged. This arrangement is the most advantageous for reaching the resulting accuracy of measurement because the measurement is based on the evaluation of change of relative differences between the values measured by both measuring elements. Another advantage is the considerably quicker, simpler and cheaper evaluation unit that works on the basis of comparative measurement.

In an advantageous variant, the (body deformation) load measuring element is in direct contact with the bottom of the body and at its inner protrusion and the protrusion is advantageously arranged in the point of the highest body deformation caused by the vehicle passing over it. An advantage is that the highest possible difference between both measured values is ensured in this way, which results in higher measurement accuracy.

It is advantageous if the measuring device comprises of at least two groups of measuring elements arranged along the body. The measuring elements can in this way be arranged regularly or irregularly with respect to a particular application. An advantage is not only higher accuracy of the measurement but also the possibility of determination of further parameters of the passing vehicles such as number and type of axles, condition of individual tires such as their wrong inflation.

To obtain a high accuracy measurement, it is advantageous for the body to be arranged in the road surface. The body can be directly embedded in the road surface so that it gets indirect contact with wheels of the passing vehicles. A certain disadvantage is the necessity of a destructive intervention into the road surface in case of a maintenance repair or replacement. The body may also be arranged under the road surface but this option decreases the measurement accuracy considerably. The body is embedded in the road surface in such a manner that it is directly, i.e. without any intermediate layer, exposed to the wheel loads of passing vehicles.

The measuring elements are advantageously arranged in such a manner that they can measure the vertical component of the load and they are most advantageously arranged vertically to body surface, i.e. vertically to the road surface.

It is very advantageous if the body width is smaller than the track length of the vehicle. Thus, the necessity for compensation of dynamic forces of passing vehicles is eliminated because these forces are held by the neighbourhood of the body or, to be more precise, they are transmitted and held by the road surface which is still touched by the larger part of the vehicle wheel.

Furthermore, it is also very advantageous if the body is made as a closed beam. This facilitates very accurate measurement of the body deformation itself which leads to the best possible final results.

From the follow-up maintenance point of view, it is most advantageous if the body is placed in a bed arranged/embedded in the road surface. This facilitates servicing or repairing the body in case of defects in an easy way without any destruction of the road surface which is a considerable advantage. The bed facilitates leading the necessary cables from individual groups of measuring elements out to the evaluating units in an easy way.

If we consider the simplicity of the design, it is advantageous if the body is fixed in the bed with at least one strap connected with the bed with at least one fastening means.

It is also advantageous if the bed is provided with at least one cable duct to facilitate installation and servicing.

It is also advantageous if the measuring element contains at least one optical fibre.

Furthermore, it is advantageous if optical fibres of measuring elements are connected with the evaluating unit which advantageously contains an opto-electrical converter with a high sampling rate and a central processor unit. The high sampling rate makes a high measurement accuracy possible because it facilitates making the smoothest possible curve of the curse of the load from which the particular load is then determined.

The aforementioned weaknesses are, to a large extent, further eliminated and the goals of the invention accomplished by the measuring method, especially the method of measuring various parameters of passing vehicles carried out by the afore-described device according to the invention whose nature lies in the fact that at least one (body deformation) load measuring element and at least one another measuring element with a zero deformation load or with a deformation load different from the (body deformation) load measuring element arranged in at least one group continuously transmit, when the vehicle passes over, parameters of light passage for further processing to be carried out by at least one evaluation unit where the difference between these parameters is determined. The advantage is that the measurement is carried out in a comparative way and that it is ratio-based which brings a simplification of the evaluating method.

It is advantageous if the evaluation unit determines (from the time-based course of the differences) at least one parameter of the passing vehicle.

The main advantage of the invention is the fact that the measurements are carried out by the measuring device in a comparative (ratio-based) way among elements of groups of more than one optical measuring element placed in the measuring points. The measuring elements measure deformation of the measuring beam in various directions and/or in the cross-sectional direction simultaneously. Some of the optical measuring elements in the given group measure beam deformation caused by wheels of passing vehicle while other optical measuring elements find out the reference dimensions in the cross-section of the beam that are not (or very little) affected by the deformation caused by the wheels, where the optical measuring elements are placed as close to each other as possible. The initial information about the load comes from the change in length or mutual position of the optical fibres caused by pressure applied by the vehicle wheel which is gained through the transversal deformation of the measuring beam embedded in the road surface. This change is opto-electrically evaluated in the opto-electrical converter with a high sampling rate, therefore with high measurement accuracy and time resolution. Also, mechanical changes of the optical fibres of the optical measuring elements under the load are compared opto-electrically with those optical measuring elements which are not (or very little) exposed to the load.

Another great advantage is the fact that the optical measuring elements in a group are exposed to the identical environment/medium so that temperature, position, production, and installation errors are eliminated.

A great advantage is, compared with the existing state of the art, the fact that the said weight measuring device is very resistant to interference as it uses light for measurement which means that it is not affected by e.g. the electromagnetic radiation of devices located in passing vehicles.

OVERVIEW OF THE FIGURES

Figure 2:
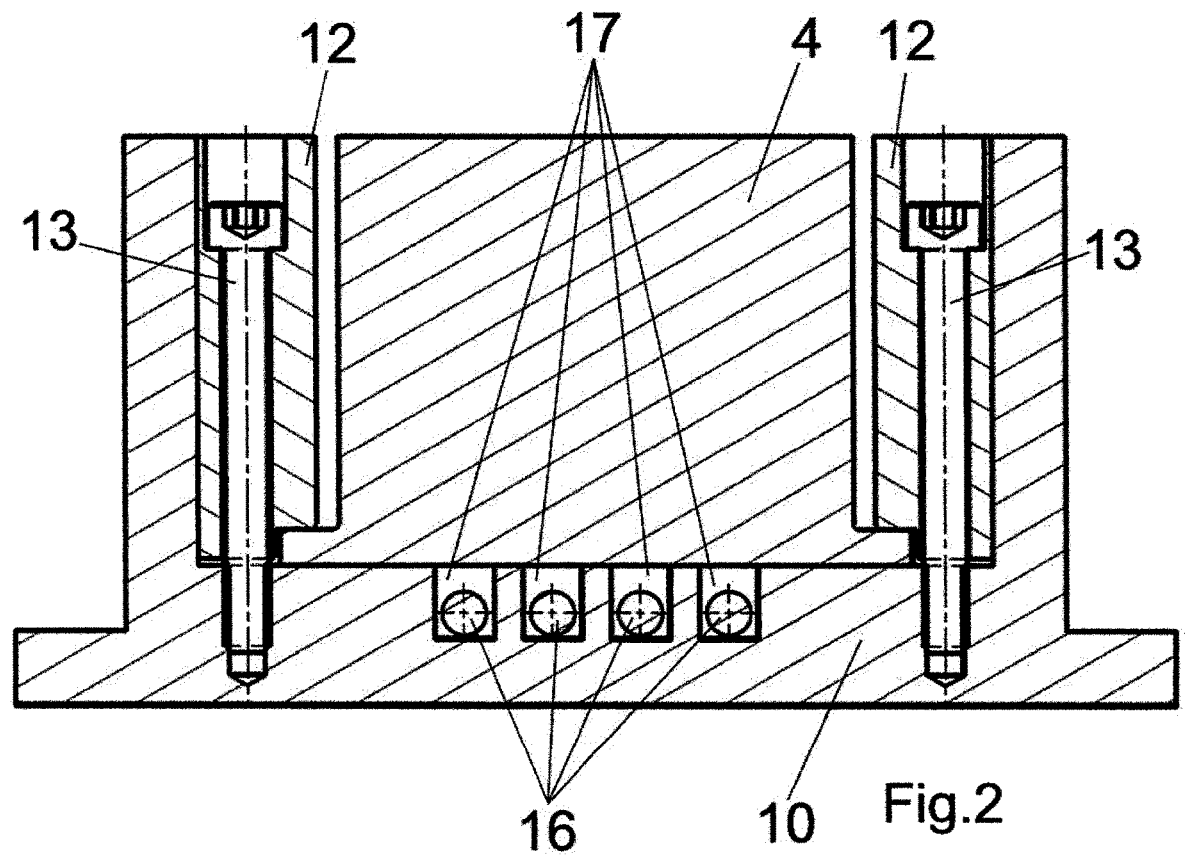
Figure 3:
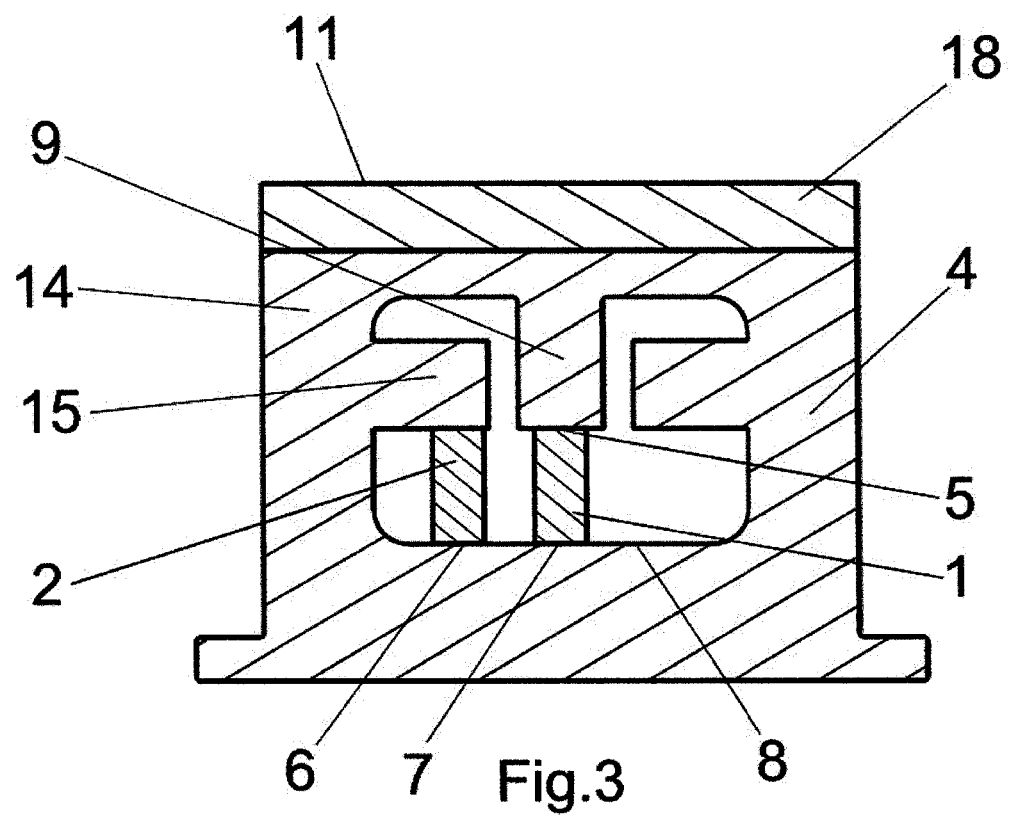
Figure 4:
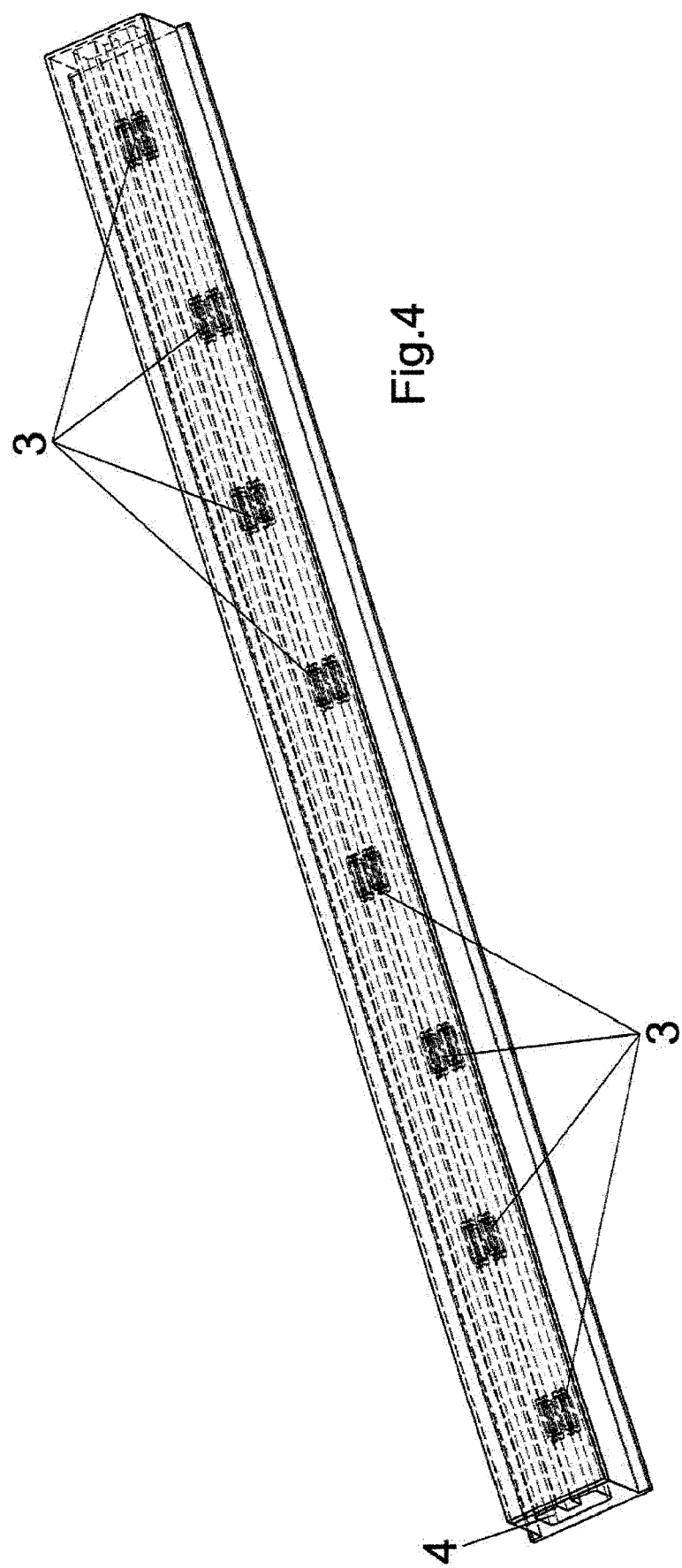
Figure 5:
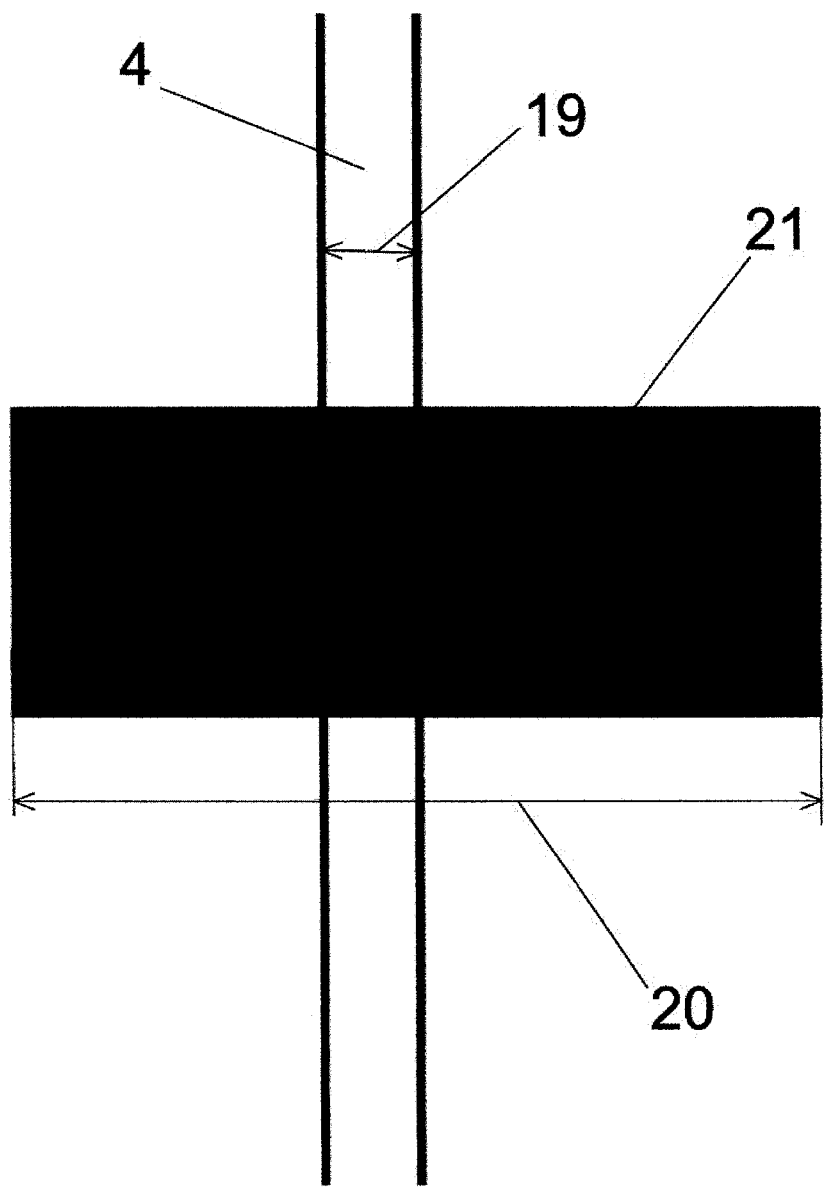

The invention will be explained in more detail in drawings where FIG. 1 shows (in cross-section) the arrangement of the body with the (body deformation) load measuring element and with the element with a zero deformation load, where FIG. 2 shows (in cross-section) the arrangement of the body in the bed, where FIG. 3 shows (in cross-section) the arrangement of the body with the (body deformation)

load measuring element and with the element having a different load in comparison with the (body deformation) load measuring element, where FIG. 4 shows a 3D view of one section of the body in which individual groups of measuring elements are placed, and where FIG. 5 shows the track of a vehicle running over the body of the measuring device.

EXAMPLES OF THE PERFORMANCE OF THE INVENTION

The weight measuring device and (at the same time) the device able to determine further parameters of passing vehicles from the weight measured (such as speed, acceleration, deceleration, turning to the right and to the left, direction of movement, number and kind of axles, condition of individual tires) consists of a body 4 (FIG. 4) in which more groups 3 of measuring elements 1, 2, are arranged regularly along its whole length. The body 4 (FIG. 1, FIG. 3) which is part of the road surface 11 of the carriageway contains an abrasive layer 18 exactly level with the road surface 11. The body 4 is arranged in the road surface 11 in such a manner that it is deformed when being passed over by a vehicle due to the load of its wheels.

According to the first variant (FIG. 1), each group 3 includes one (body 4 deformation) load measuring element 1 and one measuring element 2 with a zero deformation load for compensation arranged in a casing (not shown) of a foam material. The (body deformation) load measuring element 1 is arranged in such a point 5 of the body 4 where the deformation is the highest. The measuring element 2 with a zero load is arranged in such a point of the body 4 where the load-induced deformation of the body 4 is zero. In this variant, the (body deformation) load measuring element 1 is in direct contact with the body 4 in the point 7 of its bottom 8 and in the point 5 of its inner protrusion 9. The measuring element 2 with a zero load touches the body 4 only in the point 6 of its bottom 8.

According to the second variant (FIG. 3), each group 3 includes one (body 4 deformation) load measuring element 1 and one measuring element 2 with a deformation load different from the load measuring element 1 for compensation. Both measuring elements 1, 2 are arranged in a casing (not shown) of a foam material. The (body deformation) load measuring element 1 is arranged in such a point 5 of the body 4 where the deformation is the highest. The measuring element 2 with a load different from the load measuring element 1 is arranged in such a point of the body 4 where the load-induced deformation of the body 4 is different as compared with the point of the body 4 where the load measuring element 1 is arranged. Also in this variant, the (body deformation) load measuring element 1 is in direct contact with the body 4 in the point 7 of its bottom 8 and in the point 5 of its inner protrusion 9. The measuring element 2 with a load different than that of the load measuring element 1 touches the body 4 only in the point 6 of its bottom 8 and, in addition to that, it leans against a flange 15 arranged in the side wall 14 of the body 4.

The body 4 is made as a closed beam.

The body 4 with the groups 3 of measuring elements 1, 2 according to both the aforementioned variants can be arranged (embedded) directly in the road surface 11 by laying it in a pre-prepared gap and then filling it up with a material which, after hardening, anchors the body firmly in the road surface 11.

The measuring elements 1, 2 to measure the vertical component of the load are arranged vertically to the road surface 11. There is, however, a possibility of arranging them obliquely to the road surface 11 but the value of the vertical component of the load must then additionally be calculated.

The width 19 of the body 4 (FIG. 5) is smaller than the length 20 of the track 21 of the vehicle.

According to another, more advantageous variant (FIG. 2), the body 4 is placed in the bed 10 which is arranged (embedded) in the road surface 11 and anchored in a similar manner. The body 4 is fixed in the bed 10 using a pair of straps 12 connected with the bed 10 with fastening means 13 (fastening bolts). The bed contains four cable ducts 17.

Each of the measuring elements 1, 2 contains one optical fibre (not shown).

The optical fibres of the measuring elements 1, 2 are connected with the evaluation unit (not shown) using an optical cable 16. The evaluation unit includes an opto-electrical converter with a high sampling rate and a central processing unit.

The whole carriageway width is usually covered by a set of more individual bodies 4 with groups 3 of measuring elements 1, 2 placed in one bed or in more beds 10 which, at the same time, serve for leading optical cables 16 from individual groups 3 of measuring elements 1, 2. Optical connection between groups 3 of measuring elements 1, 2 in one body is usually carried out by one optical cable 16.

The measuring device works as follows: The (body 4 deformation) load measuring element 1 and the measuring element 2 with a zero deformation load or with a load different from that of the load measuring element 1 arranged in one group 3 continuously transmit, when the vehicle passes over, parameters of light passage for further processing to be carried out by at least one evaluation unit where the difference between these parameters is determined. The difference is then converted into a digital or analogue signal and the central processor unit can determine (from the time-based form of individual differences) parameters of the passing vehicle, e.g. its weight.

INDUSTRIAL APPLICATION

The Weight Measuring Device and the Measuring Method according to the invention can be utilized for measuring various parameters of passing vehicles, especially for determination of their weight.

LIST OF REFERENCE MARKS

1 Measuring Element I
2 Measuring Element II
3 Group
4 Body
5 Point I
6 Point II
7 Point III
8 Bottom
9 Inner Protrusion
10 Bed
11 Road Surface
12 Strap
13 Fastening Means
14 Side Wall
15 Flange
16 Optical Cable
17 Cable Duct
18 Abrasive Layer
19 Width 20 Length of the Track of the Vehicle
21 Track of the Vehicle

The invention claimed is:

1. A weight measuring device to measure the weight of passing vehicles from which can be determined further parameters of the passing vehicles including one or more of speed, acceleration, deceleration, turning to the right and to the left, direction of movement, number and type of axles, and condition of individual tires, the weight measuring device comprising:
   at least three groups of two measuring elements arranged in a body configured to form a part of a road surface,
   wherein the three groups of measuring elements are arranged along a length of the body,
   wherein the measuring elements contain at least one optical fiber,
   wherein at least one of the measuring elements is a body load deformation measuring element and at least another one of the measuring elements is arranged in the body in such a manner that the at least another one of the measuring elements has a zero deformation load or a deformation load different from that of the body load deformation measuring element,
   wherein the weight measuring device further comprises: a processor, and
   an opto-electrical converter connected between the at least one optical fiber and the processor, and
   wherein the processor is configured to determine the weight of the passing vehicle based on a difference between parameters of light passage through the at least one optical fiber of the at least one of the measuring elements and the at least another one of the measuring elements of a respective group of measuring elements such that the weight is determined in a comparative way that is ratio-based.

2. The weight measuring device according to claim 1, wherein the body load deformation measuring element is arranged at a first point in the body where a load-induced deformation of the body is the highest and the at least another one of the measuring elements is arranged at a second point in the body where the load-induced deformation of the body is zero or different from that in the first point in the body where the body load deformation measuring element is arranged.

3. The weight measuring device according to claim 1, wherein the body load deformation measuring element at a bottom thereof is in direct contact with the body and at an upper end thereof to an inner protrusion of the body.

4. The weight measuring device according to claim 1, wherein the measuring elements are arranged for measurement of a vertical component of the load.

5. The weight measuring device according to claim 1, wherein a width of the body is smaller than a length of a track of the vehicle.

6. The weight measuring device according to claim 1, wherein the body is made as a closed beam.

7. The weight measuring device according to claim 1, wherein the body is configured for placement in a bed in the road surface.

8. A weight measuring installation comprising the weight measuring device according to claim 7 and the bed in the road surface, wherein the body is fixed in the bed with at least one strap connected with the bed using at least one fastening means.

9. A weight measuring installation comprising the weight measuring device according to claim 7 and the bed in the road surface, wherein the bed contains at least one cable duct.

10. A measuring method comprising the steps of:
    directing a vehicle to pass over the measuring device according to claim 1 in a bed of a road surface, and using the measuring device to measure the weight of the passing vehicle.

11. The measuring method according to claim 10, wherein the processor determines, from a time-based form of the differences of the parameters of light passage, at least one parameter of the passing vehicle.

* * * * *